(12) United States Patent
Taherzadeh Boroujeni et al.

(10) Patent No.: US 12,302,330 B2
(45) Date of Patent: May 13, 2025

(54) PHYSICAL UPLINK CONTROL CHANNEL WITH AN ADAPTIVE NUMBER OF ORTHOGONAL FREQUENCY-DIVISION MULTIPLEXING SYMBOLS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Alexei Yurievitch Gorokhov, San Diego, CA (US); Peter Gaal, San Diego, CA (US); Xiaoxia Zhang, San Diego, CA (US); Juan Montojo, San Diego, CA (US); Wooseok Nam, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 17/450,640

(22) Filed: Oct. 12, 2021

(65) Prior Publication Data

US 2022/0116937 A1    Apr. 14, 2022

Related U.S. Application Data

(60) Provisional application No. 63/198,359, filed on Oct. 13, 2020.

(51) Int. Cl.
*H04W 72/21* (2023.01)
(52) U.S. Cl.
CPC .................................. *H04W 72/21* (2023.01)
(58) Field of Classification Search
CPC ... H04L 5/0053; H04L 5/0055; H04L 5/0057; H04W 72/02; H04W 72/04;
(Continued)

(56) References Cited

U.S. PATENT DOCUMENTS

2017/0318574 A1* 11/2017 Choi .................... H04L 5/0048
2018/0368169 A1* 12/2018 Jung .................... H04W 72/21
(Continued)

OTHER PUBLICATIONS

CATT: "On PUCCH Resource Allocation", 3GPP Draft, 3GPP TSG RAN WG1 Meeting #93, R1-1806298, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441505, 6 Pages, Retrieved from the Internet: URL: http://www.3gpp.org/ftp/Meetings%5F3GPP%5FSYNC/RAN1/Docs/ [retrieved on May 20, 2018] the whole document, table 1, sections 1, 2.1.

(Continued)

*Primary Examiner* — Bo Hui A Zhu
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station, a first configuration for a physical uplink control channel (PUCCH) resource set, the first configuration associated with a first configured number of symbols for a PUCCH. The UE may receive, from the base station, an indication of a number of symbols to be used for transmitting the PUCCH, the indicated number of symbols being different from the first configured number of symbols. The UE may transmit the PUCCH using the indicated number of symbols. Numerous other aspects are provided.

30 Claims, 10 Drawing Sheets

(58) Field of Classification Search
CPC ........... H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 2019/0045498 A1 | 2/2019 | Huang et al. | |
| 2019/0052422 A1 | 2/2019 | Yin et al. | |
| 2019/0261356 A1* | 8/2019 | Myung | H04W 48/12 |
| 2019/0356446 A1 | 11/2019 | Kim et al. | |
| 2020/0015223 A1* | 1/2020 | Matsumura | H04L 5/0053 |
| 2021/0378046 A1* | 12/2021 | Shimoda | H04B 7/022 |
| 2022/0159692 A1* | 5/2022 | Lee | H04L 5/0053 |
| 2022/0338226 A1* | 10/2022 | Nemeth | H04L 5/001 |
| 2023/0098722 A1* | 3/2023 | Matsumura | H04W 72/1268 |
| 2023/0362939 A1* | 11/2023 | Lidian | H04L 5/006 |

OTHER PUBLICATIONS

International Search Report and Written Opinion—PCT/US2021/071845—ISA/EPO—Apr. 20, 2022.

LG Electronics: "UCI Enhancements for NR URLLC", 3GPP Draft, R1-1904628, 3GPP TSG RAN WG1 #96bis, URLLC UCI, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 3, 2019 (Apr. 3, 2019), pp. 1-6, XP051707260, 6 Pages, Retrieved from the Internet: URL: http://www.3gpp.org/ftp/tsg%5Fran/WG1%5FRL1/TSGR1%5F96b/Docs/R1%2D1904628%2Ezip [retrieved on Apr. 3, 2019] sections 2, 3.

Lin X., et al., "5G New Radio: Unveiling the Essentials of the Next Generation Wireless Access Technology", IEEE Communications Standards Magazine 3.3, IEEE, vol. 3, No. 3, Sep. 1, 2019 (Sep. 1, 2019), pp. 30-37, XP011759193, ISSN: 2471-2825, DOI:10.1109/MCOMSTD.001.1800036 [retrieved on Dec. 6, 2019] figure 5 p. 35.

NEC: "Remaining Issues on Multi-CSI PUCCH", 3GPP Draft, R1-1801901, 3GPP TSG RAN WG1 Meeting #92, Remaining Issues on Multi-CSI PUCCH, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 15, 2018 (Feb. 15, 2018), XP051396821, pp. 1-3, Retrieved from the Internet: URL: http://www.3gpp.org/ftp/tsg%5Fran/WG1%5FRL1/TSGR1%5F92/Docs/ [retrieved on Feb. 15, 2018] Sections 1-3.

Partial International Search Report—PCT/US2021/071845—ISA/EPO—Feb. 28, 2022.

* cited by examiner

PHYSICAL UPLINK CONTROL CHANNEL WITH AN ADAPTIVE NUMBER OF ORTHOGONAL FREQUENCY-DIVISION MULTIPLEXING SYMBOLS

CROSS-REFERENCE TO RELAYED APPLICATION

This Patent Application claims priority to U.S. Provisional Patent Application No. 63/198,359, filed on Oct. 13, 2020, entitled "SHORT PHYSICAL UPLINK CONTROL CHANNEL WITH AN ADAPTIVE NUMBER OF ORTHOGONAL FREQUENCY-DIVISION MULTIPLEXING SYMBOLS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink control channel (PUCCH) with an adaptive number of orthogonal frequency-division multiplexing (OFDM) symbols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes receiving, from a base station, a first configuration for a PUCCH resource set, the first configuration associated with a first configured number of symbols for a physical uplink control channel (PUCCH); receiving, from the base station, an indication of a number of symbols to be used for transmitting the PUCCH, the indicated number of symbols being different from the first configured number of symbols; and transmitting, to the base station, the PUCCH using the indicated number of symbols.

In some aspects, a method of wireless communication performed by a base station includes transmitting, to a UE, a first configuration for a PUCCH resource set, the first configuration associated with a first configured number of symbols for a PUCCH; transmitting, to the UE, an indication of a number of symbols to be used by the UE for transmitting the PUCCH, the indicated number of symbols being different from the first configured number of symbols; and receiving, from the UE, the PUCCH in the indicated number of symbols.

In some aspects, a UE for wireless communication includes a memory; and one or more processors coupled to the memory, the memory and the one or more processors configured to: receive, from a base station, a first configuration for a PUCCH resource set, the first configuration associated with a first configured number of symbols for a PUCCH; receive, from the base station, an indication of a number of symbols to be used for transmitting the PUCCH, the indicated number of symbols being different from the first configured number of symbols; and transmit, to the base station, the PUCCH using the indicated number of symbols.

In some aspects, a base station for wireless communication includes a memory; and one or more processors coupled to the memory, the memory and the one or more processors configured to: transmit, to a UE, a first configuration for a PUCCH resource set, the first configuration associated with a first configured number of symbols for a PUCCH; transmit, to the UE, an indication of a number of symbols to be used by the UE for transmitting the PUCCH, the indicated number of symbols being different from the first configured number of symbols; and receive, from the UE, the PUCCH in the indicated number of symbols.

In some aspects, a non-transitory computer-readable medium storing a set of instructions for wireless communication includes one or more instructions that, when executed by one or more processors of a UE, cause the UE to: receive, from a base station, a first configuration for a PUCCH resource set, the first configuration associated with a first configured number of symbols for a PUCCH; receive, from the base station, an indication of a number of symbols to be used for transmitting the PUCCH, the indicated number of symbols being different from the first configured number of symbols; and transmit, to the base station, the PUCCH using the indicated number of symbols.

In some aspects, a non-transitory computer-readable medium storing a set of instructions for wireless communication includes one or more instructions that, when executed by one or more processors of a base station, cause the base station to: transmit, to a UE, a first configuration for a PUCCH resource set, the first configuration associated with a first configured number of symbols for a PUCCH; transmit, to the UE, an indication of a number of symbols to be used by the UE for transmitting the PUCCH, the indicated number of symbols being different from the first configured number of symbols; and receive, from the UE, the PUCCH in the indicated number of symbols.

In some aspects, an apparatus for wireless communication includes means for receiving, from a base station, a first configuration for a PUCCH resource set, the first configuration associated with a first configured number of symbols for a PUCCH; means for receiving, from the base station, an indication of a number of symbols to be used for transmitting the PUCCH, the indicated number of symbols being different from the first configured number of symbols; and means for transmitting, to the base station, the PUCCH using the indicated number of symbols.

In some aspects, an apparatus for wireless communication includes means for transmitting, to a UE, a first configuration for a PUCCH resource set, the first configuration associated with a first configured number of symbols for a PUCCH; means for transmitting, to the UE, an indication of a number of symbols to be used by the UE for transmitting the PUCCH, the indicated number of symbols being different from the first configured number of symbols; and means for receiving, from the UE, the PUCCH in the indicated number of symbols.

In some aspects, a method of wireless communication performed by a UE includes receiving, from a base station, a configuration associated with configuring a number of symbols to be used by the UE for transmitting a short PUCCH, wherein the number of symbols to be used by the UE for transmitting the short PUCCH is greater than two (2) symbols; and transmitting, to the base station, the short PUCCH using the configured number of symbols.

In some aspects, a method of wireless communication performed by a base station includes transmitting, to a UE, a configuration associated with configuring a number of symbols to be used by the UE for transmitting a short PUCCH, wherein the number of symbols to be used by the UE for transmitting the short PUCCH is greater than two (2) symbols; and receiving, from the UE, the short PUCCH using the configured number of symbols.

In some aspects, a UE for wireless communication includes a memory; and one or more processors coupled to the memory, the memory and the one or more processors configured to: receive, from a base station, a configuration associated with configuring a number of symbols to be used by the UE for transmitting a short PUCCH, wherein the number of symbols to be used by the UE for transmitting the short PUCCH is greater than two (2) symbols; and transmit, to the base station, the short PUCCH using the configured number of symbols.

In some aspects, a base station for wireless communication includes a memory; and one or more processors coupled to the memory, the memory and the one or more processors configured to: transmit, to a UE, a configuration associated with configuring a number of symbols to be used by the UE for transmitting a short PUCCH, wherein the number of symbols to be used by the UE for transmitting the short PUCCH is greater than two (2) symbols; and receive, from the UE, the short PUCCH using the configured number of symbols.

In some aspects, a non-transitory computer-readable medium storing a set of instructions for wireless communication includes one or more instructions that, when executed by one or more processors of a UE, cause the UE to: receive, from a base station, a configuration associated with configuring a number of symbols to be used by the UE for transmitting a short PUCCH, wherein the number of symbols to be used by the UE for transmitting the short PUCCH is greater than two (2) symbols; and transmit, to the base station, the short PUCCH using the configured number of symbols.

In some aspects, a non-transitory computer-readable medium storing a set of instructions for wireless communication includes one or more instructions that, when executed by one or more processors of a base station, cause the base station to: transmit, to a UE, a configuration associated with configuring a number of symbols to be used by the UE for transmitting a short PUCCH, wherein the number of symbols to be used by the UE for transmitting the short PUCCH is greater than two (2) symbols; and receive, from the UE, the short PUCCH using the configured number of symbols.

In some aspects, an apparatus for wireless communication includes means for receiving, from a base station, a configuration associated with configuring a number of symbols to be used by the UE for transmitting a short PUCCH, wherein the number of symbols to be used by the UE for transmitting the short PUCCH is greater than two (2) symbols; and means for transmitting, to the base station, the short PUCCH using the configured number of symbols.

In some aspects, an apparatus for wireless communication includes means for transmitting, to a UE, a configuration associated with configuring a number of symbols to be used by the UE for transmitting a short PUCCH, wherein the number of symbols to be used by the UE for transmitting the short PUCCH is greater than two (2) symbols; and means for receiving, from the UE, the short PUCCH using the configured number of symbols.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
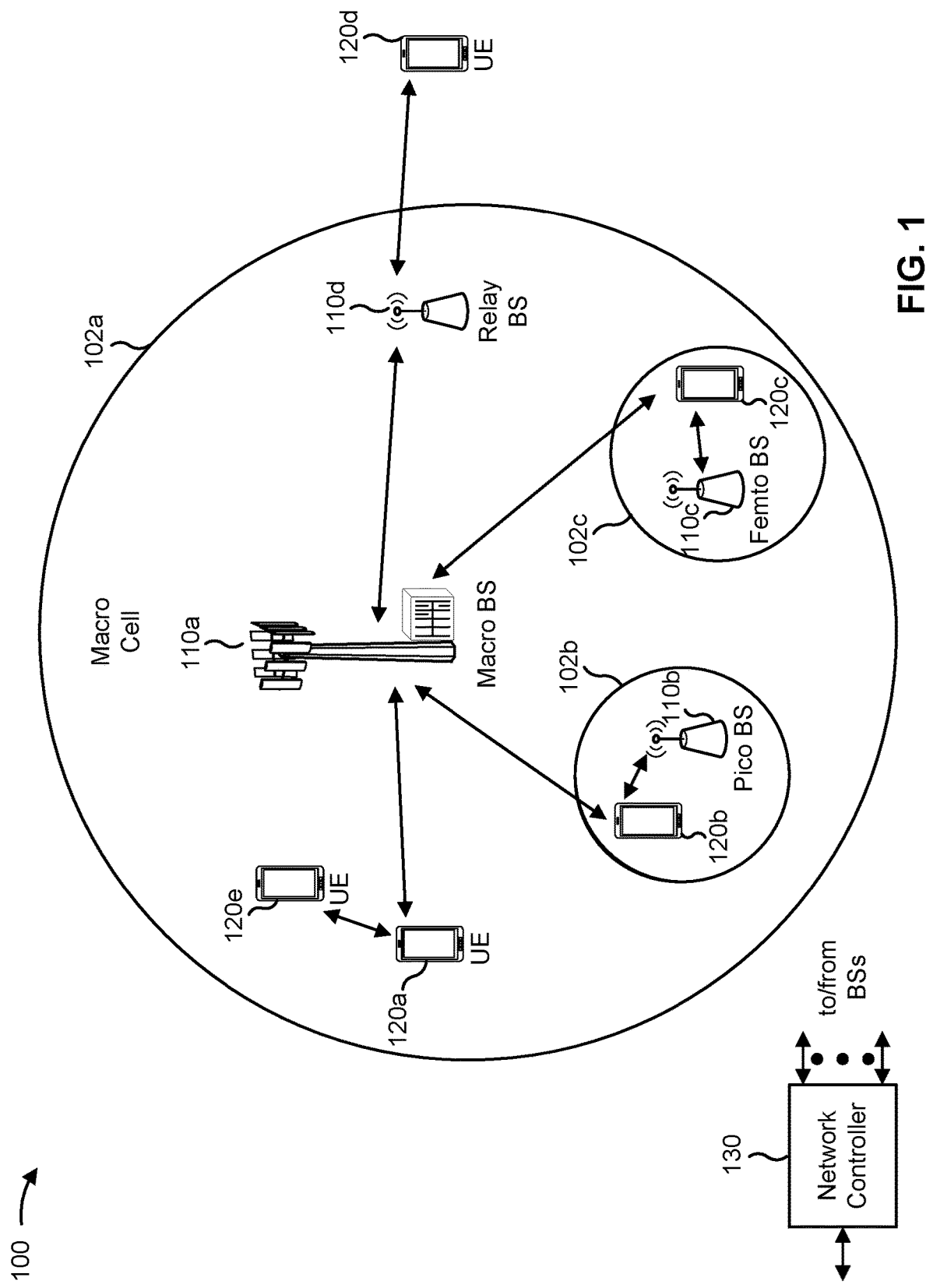
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
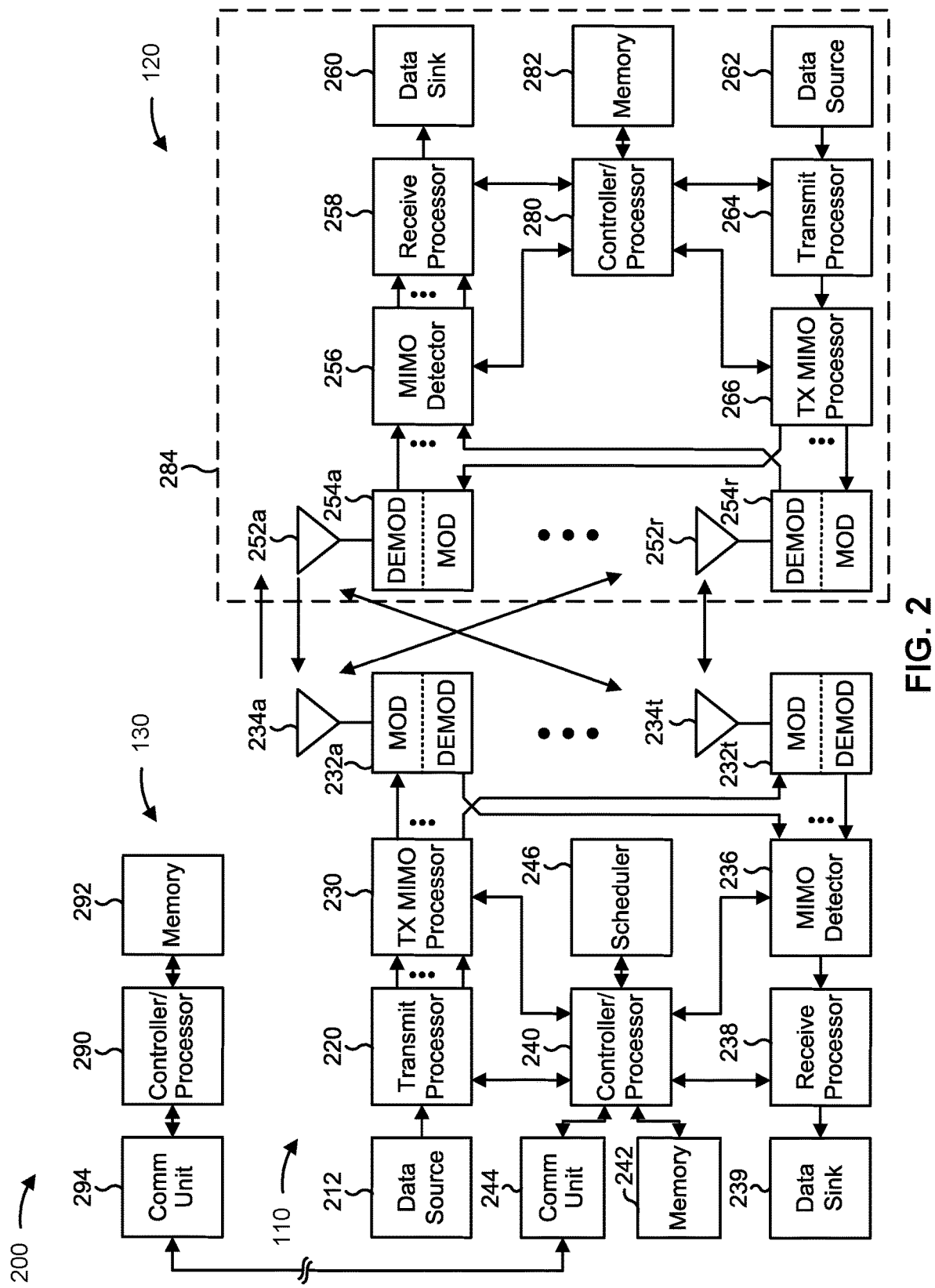
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A, 3B, 4, 5, 6, and 7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A, 3B, 4, 5, 6, and 7).

The controller/processor 240 of the base station 110, the controller/processor 280 of the UE 120, and/or any other component(s) of FIG. 2 may perform one or more techniques associated with a PUCCH with an adaptive number of OFDM symbols, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, UE 120 may include means for receiving, from a base station 110, a first configuration for a PUCCH resource set, the first configuration associated with a first configured number of symbols for a PUCCH (e.g., using antenna 252, DEMOD 254, MIMO detector 256, receive processor 258, controller/processor 280, memory 282, and/or the like); means for receiving, from the base station 110, an indication of a number of symbols to be used for transmitting the PUCCH, the indicated number of symbols being different from the first configured number of symbols (e.g., using antenna 252, DEMOD 254, MIMO detector 256, receive processor 258, controller/processor 280, memory 282, and/or the like); means for transmitting, to the base station 110, the PUCCH using the indicated number of symbols (e.g., using controller/processor 280, transmit processor 264, TX MIMO processor 266, MOD 254, antenna 252, memory 282, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, a first configuration for a PUCCH resource set, the first configuration associated with a first configured number of symbols for a PUCCH (e.g., using controller/processor 240, transmit processor 220, TX MIMO processor 230, MOD 232, antenna 234, memory 242, and/or the like); means for transmitting, to the UE 120, an indication of a number of symbols to be used by the UE 120 for transmitting the PUCCH, the indicated number of symbols being different from the first configured number of symbols (e.g., using controller/processor 240, transmit processor 220, TX MIMO processor 230, MOD 232, antenna 234, memory 242, and/or the like); means for receiving, from the UE 120, the PUCCH in the indicated number of symbols (e.g., using antenna 234, DEMOD 232, MIMO detector 236, receive processor 238, controller/processor 240, memory 242, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving, from a base station 110, a configuration associated with configuring a number of symbols to be used by the UE 120 for transmitting a short PUCCH, wherein the number of symbols to be used by the UE for transmitting the short PUCCH is greater than two (2) symbols (e.g., using antenna 252, DEMOD 254, MIMO detector 256, receive processor 258, controller/processor 280, memory 282, and/or the like); means for transmitting, to the base station 110, the short PUCCH using the configured number of symbols (e.g., using controller/processor 280, transmit processor 264, TX MIMO processor 266, MOD 254, antenna 252, memory 282, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, a configuration associated with configuring a number of symbols to be used by the UE for transmitting a short PUCCH (e.g., using controller/processor 240, transmit processor 220, TX MIMO processor 230, MOD 232, antenna 234, memory 242, and/or the like), wherein the number of symbols to be used by the UE for transmitting the short PUCCH is greater than two (2) symbols; means for receiving, from the UE, the short PUCCH using the configured number of symbols (e.g., using antenna 234, DEMOD 232, MIMO detector 236, receive processor 238, controller/processor 240, memory 242, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A physical uplink control channel (PUCCH) may be a short PUCCH or a long PUCCH. One example of a short PUCCH is a PUCCH that uses Format 0. A PUCCH using Format 0 has a length of one or two OFDM symbols, two or fewer bits of uplink control information (UCI), and uses a computer generated sequence (CGS) waveform. For a one-symbol Format 0 short PUCCH, sequence selection with low peak-to-average power ratio (PAPR) is used, two bit hybrid automatic repeat request acknowledgment (HARQ-ACK) and a scheduling request (SR) can be simultaneously transmitted, and CGS sequences of length 12 with consecutive mapping within a physical resource block (PRB) are supported (where the supported number of base sequences is 30 and the a number of cyclic shifts available for one base sequence is 12). For a two-symbol Format 0 short PUCCH, the two-symbol PUCCH is composed of two one-symbol PUCCHs conveying the same UCI, sequence hopping between the two symbols is supported, and frequency hopping is supported at least for localized (contiguous) PRB allocations in each symbol (where frequency hopping occurs within the active uplink bandwidth part (BWP), the active BWP referring to the BWP associated with a numerology of the PUCCH).

Another example of a short PUCCH is a PUCCH that uses Format 2. A PUCCH using Format 2 PUCCH has a length of 1 or 2 OFDM symbols, more than 2 bits of UCI, and uses an OFDM waveform. For a one- or two-symbol Format 2 short PUCCH, a reference signal (RS) and the UCI are multiplexed in an FDM manner in the symbol, where the RS and the UCI are mapped on different subcarriers and coherent demodulation is supported. Further, encoded UCI bits are scrambled using a pseudo-noise (PN) sequence generator initialized based on a scrambling identifier for a physical uplink shared channel (PUSCH), and quadrature phase shift keying (QPSK) is used for modulation of the UCI. Additionally, a number of PRBs for the PUCCH transmission is determined based on a total number of UCI bits and a configured maximum code-rate, and is upper bounded by a configured number of PRBs (in some cases only localized (contiguous) allocations are supported). The number of PRBs that can be used for a PUCCH is configurable. In addition to being determined based on a radio resource control (RRC) configuration, the number of PRBs can be determined as a function of UCI payload size or can be dynamically indicated via downlink control information (DCI). Additionally, the number of demodulation reference signal (DMRS) resource elements (REs) per PRB is four, and DMRS REs are evenly distributed within a PRB (in subcarriers 1, 4, 7, and 10 for a given RB). For a two-symbol transmission, the same DMRS density and pattern (i.e., the DMRS locations) as a one-symbol short PUCCH with a UCI payload of more than two bits is used for each symbol of the two-symbol PUCCH. Sequences used for the DMRS are the same as for CP-OFDM PUSCH DMRS. Furthermore, for a two-symbol Format 2 short-PUCCH, encoded UCI bits are mapped across two symbol and frequency hopping is supported, where frequency hopping occurs within the active uplink BWP, the active BWP referring to the BWP associated with the numerology of PUCCH. Additionally, simultaneous transmission of HARQ-ACK bits and channel state information (CSI) feedback with PUCCH Format 2 is supported by RRC configuration. In some implementations, the definition of a Format 2 PUCCH can be modified to include greater than two (2) symbols (such that the resulting modified format is, for example, a modified Format 2, a Format 2B, or a new format with a structure similar to that of Format 2 but allowing for greater than two (2) OFDM symbols, for example, three (3) or four (4) OFDM symbols). The number of symbols (e.g., greater than two symbols) can be either defined by way of a configuration, e.g., a first configuration or a second configuration, or by way of an indication, as described elsewhere herein.

In some deployments, such as in an NR network (e.g., that uses millimeter wave (mmW)), a PUCCH may need coverage enhancement to improve performance and/or reliability associated with a transmission of the PUCCH. A short PUCCH (e.g., a PUCCH that uses Format 0, Format 2, and/or the like) is particularly vulnerable in terms of coverage in an NR network due to such a short PUCCH having a relatively short length (e.g., one or two symbols). Notably, coverage of a given PUCCH can be improved using a long PUCCH (e.g., a PUCCH that uses Format 1, Format 3, or Format 4, which have lengths from four (4) to fourteen (14) symbols). However, use of the long PUCCH format can reduce efficiency in terms of resource usage.

Some aspects described herein provide techniques and apparatuses for a PUCCH (e.g., a short PUCCH) with an adaptive number of symbols. In some aspects, a base station may transmit, and a UE may receive, an indication (e.g., a dynamic indication) of a number of symbols to be used for transmitting a PUCCH. The UE may then transmit, and the base station may receive, the PUCCH using the number of symbols based at least in part on the indication. In some aspects, such indications can be used to adapt a number of symbols used for a given PUCCH, meaning that coverage enhancement for PUCCHs (e.g., on a slot-by-slot basis) can be provided. As a result, performance and reliability associated with transmission PUCCHs can be improved without significantly impacting resource utilization efficiency of the network. Additional details are provided below.

Figure 3A:
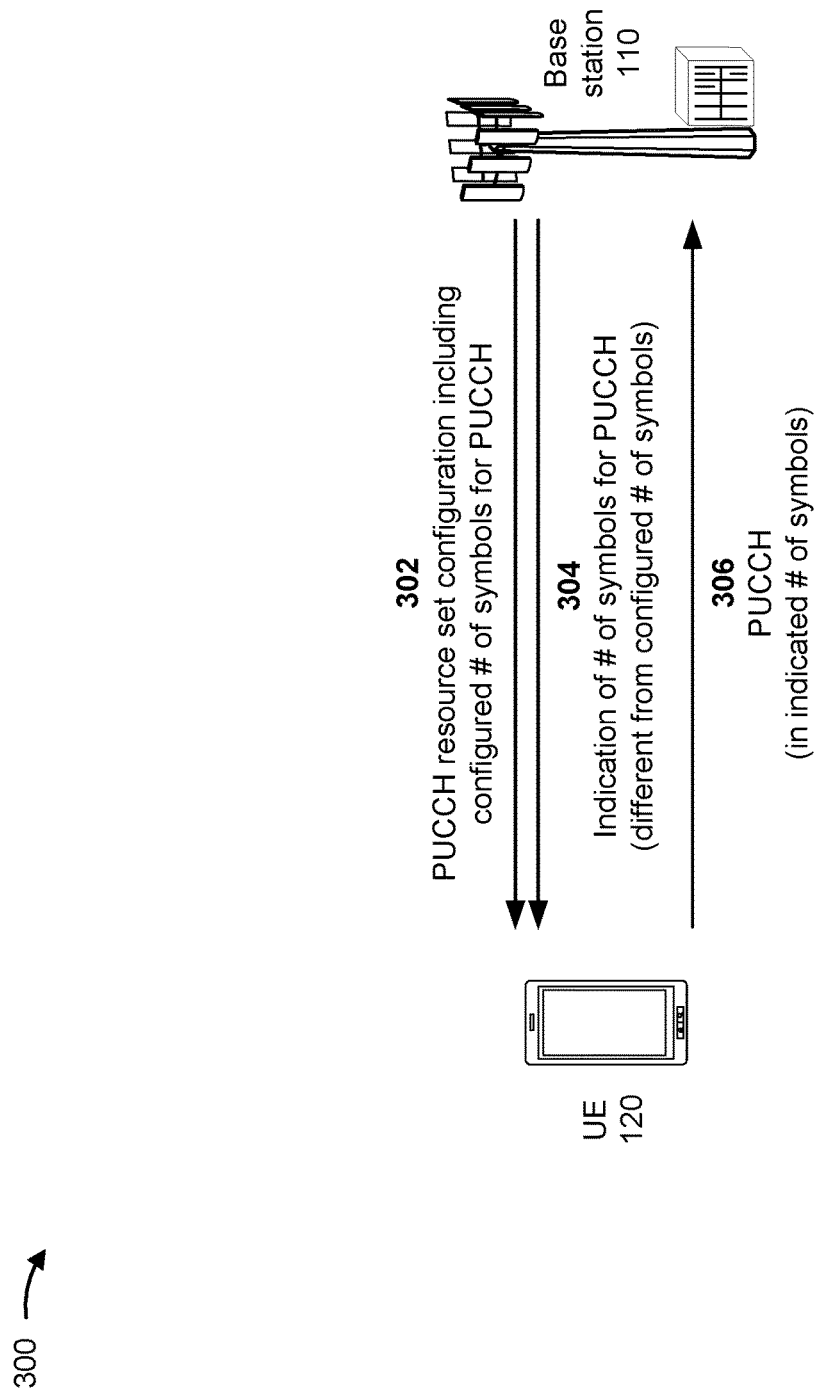
FIGS. 3A and 3B are diagrams illustrating examples associated with a PUCCH with an adaptive number of OFDM symbols, in accordance with the present disclosure.
Figure 3B:
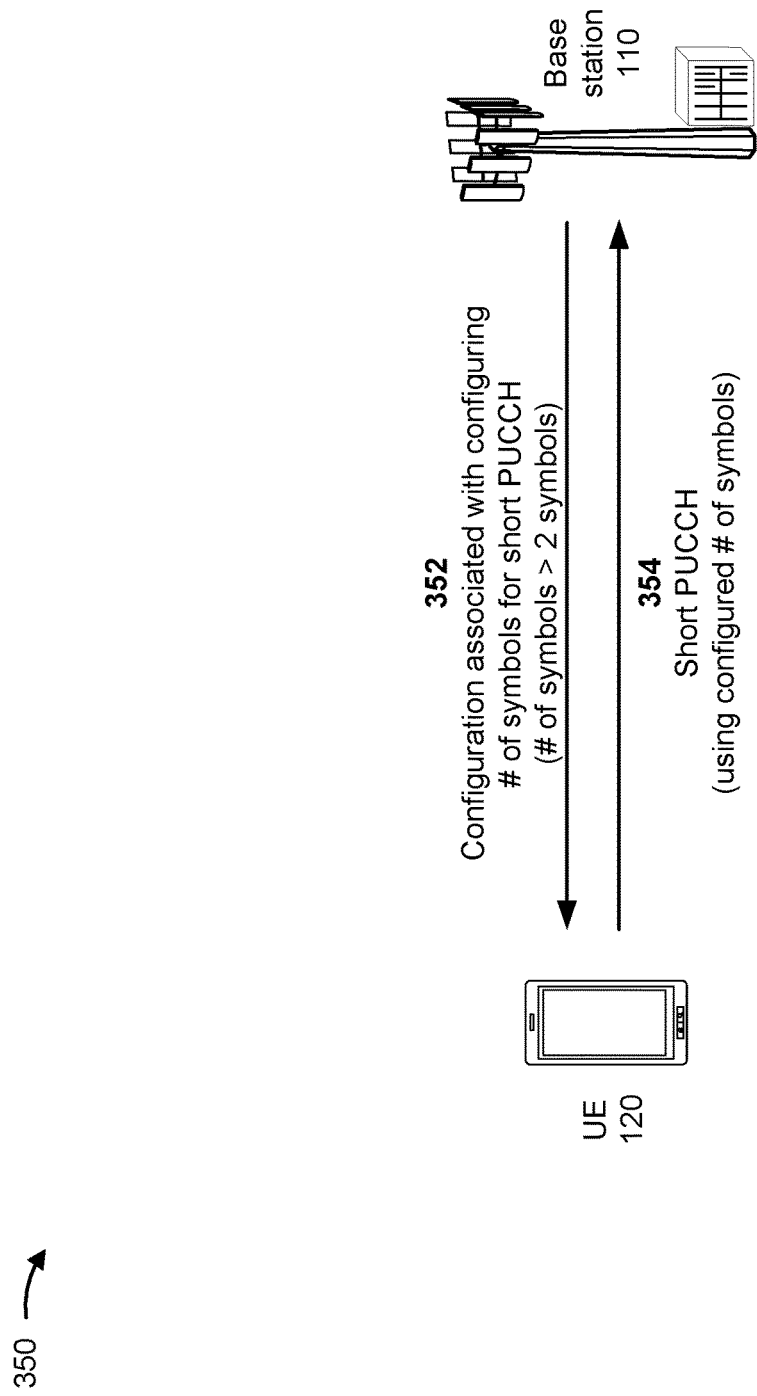

FIGS. 3A and 3B are diagrams illustrating examples 300 and 350, respectively, associated with a PUCCH with an adaptive number of OFDM symbols, in accordance with the present disclosure. As shown in FIGS. 3A and 3B, examples 300 and 350 include communication between a base station (e.g., a base station 110) and a UE (e.g., a) UE 120). In some aspects, the base station and the UE may be included in a wireless network (e.g., a wireless network 100). The base station and the UE may communicate on a wireless access link, which may include an uplink and a downlink.

With respect to example 300, as shown in FIG. 3A by reference 302, the base station may transmit, and the UE may receive, a first configuration for a PUCCH resource set. In some aspects, the first configuration is associated with a first configured number of symbols (e.g., OFDM symbols) for a short PUCCH. That is, the first configuration may include information indicating a first configured number of symbols that the UE is to use for transmitting the short PUCCH. Notably, while examples FIGS. 3A and 3B are described in the context of a short PUCCH, the techniques and apparatuses described herein can be applied to types of PUCCH other than a short PUCCH.

As shown in FIG. 3A by reference 304, the base station may transmit, and the UE may receive, an indication of a number of symbols to be used by the UE for transmitting the short PUCCH, where the indicated number of symbols is different from the first configured number of symbols. Thus, the UE may previously receive the first configuration for the PUCCH resource set, where the first configuration includes and/or is associated with a first configured number of symbols for a short PUCCH. Such a configuration can be received, for example, using Layer 3 signaling, for example RRC signaling, while the indication subsequently received by the UE can be received using Layer 1 or Layer 2 signaling A short PUCCH, as used herein, is a PUCCH that is to use Format 0, Format 2, or another format that with structure similar to that of Format 0 or Format 2 (e.g., in terms of placement of information symbols and reference symbols, mapping of symbols, encoding, or the like). In some aspects, the indication indicates that greater than two (2) symbols, e.g., at least three symbols, are to be used by the UE for transmitting the short PUCCH. That is, in some aspects, the indication may indicate that the UE is to use one or more additional symbols for transmitting the short PUCCH (e.g., rather than using one or two symbols as indicated by a format of the short PUCCH).

In some aspects, the indication is a dynamic indication associated with a change from the first configured number of symbols to the indicated number of symbols. That is, in some aspects, the number of symbols of the short PUCCH may be dynamically changed by the base station. In some aspects, the dynamic indication is a UE-specific indication, meaning that the indication is the UE in particular. Alternatively, in some aspects, the base station may transmit, and the UE may receive the dynamic indication in group-common downlink control information (DCI), a downlink medium access control (MAC) control element, or the like.

In some aspects, the dynamic indication explicitly indicates the number of symbols to be used for transmitting the short PUCCH. That is, in some aspects, the base station may explicitly indicate the number of symbols in the dynamic indication. For example, the dynamic indication may include an explicit indication that the UE is to use three symbols for transmitting the short PUCCH.

In some aspects, the dynamic indication indicates a switch from the first configuration for the PUCCH resource set to a second configuration for the PUCCH resource set, where the second configuration includes a second configured number of symbols for the short PUCCH and the indicated number of symbols is the second configured number of symbols. That is, in some aspects, the dynamic indication may be used to switch among a set of reconfigurations for PUCCH that are configured on the UE.

In some aspects, the dynamic indication is an implicit indication that is based at least in part on other signaling. In some aspects, the other signaling is a coverage enhancement indication. For example, the UE, upon receiving a coverage enhancement indication, may change (e.g., increase) the number of symbols of the short PUCCH based on receiving the coverage enhancement indication. In this way, the UE may improve coverage of the short PUCCH based at least in part on the coverage enhancement indication. In some aspects, the other signaling is a beam switching MAC control element included in a physical downlink shared channel (PDSCH). For example, the UE, upon receiving a beam switching MAC control element in a PDSCH, may change (e.g., increase) the number of symbols of the short PUCCH if the short PUCCH includes an acknowledgment in response to the PDSCH carrying the beam switching MAC control element. In this way, the UE may improve coverage of the short PUCCH based at least in part on the beam switching MAC control element in the PDSCH.

In some aspects, the indication may include another type of information associated with transmitting the short PUCCH. For example, in some aspects, the indication may include information that identifies a starting symbol for the short PUCCH. As another example, in some aspects, the indication may include information that indicates whether the short PUCCH is to permitted to be transmitted in non-contiguous symbols.

As shown by reference 306, the UE may transmit the short PUCCH using the indicated number of symbols (e.g., at least three symbols). Thus, as indicated by reference 306, the base station may receive the short PUCCH in the indicated number of symbols (after transmitting the indication to the UE). In some aspects, a starting symbol for transmitting/receiving the short PUCCH matches a starting symbol of a PUCCH resource set configured for the UE. In some aspects, whether the short PUCCH is to permitted to be transmitted in non-contiguous symbols is based at least in part on a configuration of the UE.

In some aspects, the short PUCCH transmitted by the UE includes at least three one-symbol PUCCHs having PUCCH Format 0. Here, each of the one-symbol PUCCHs may include the same UCI. Put another way, in some aspects, the UE may transmit k (k>2) one-symbol PUCCHs with Format 0, where each of the k one-symbol PUCCHs with Format 0 conveys the same UCI. In some aspects, symbols in which the at least three one-symbol PUCCHs are transmitted are permitted to be non-contiguous symbols based at least in part on a capability of the UE. That is, in some aspects, the multiple one-symbol PUCCHs may be transmitted over a contiguous or noncontiguous set of symbols, where PUCCH transmission over a noncontiguous set of symbols may depend on UE capability (e.g., for maintaining a specific level of phase continuity).

In some aspects, the short PUCCH transmitted by the UE has PUCCH Format 2. That is, in some aspects, the UE transmits PUCCH Format 2 over more than two symbols based at least in part on the indication.

In some aspects, symbols used by the UE for transmitting the short PUCCH (and symbols in which the base station receives the short PUCCH) include one or more groups of consecutive non-downlink symbols. For example, in some aspects, the short PUCCH with length k may be transmitted over k consecutive non-downlink symbols (or in k/2 groups of consecutive non-downlink symbols). As an example, for a short PUCCH with Format 2 that is to be communicated in four OFDM symbols starting from symbol 5, if symbol 7 is a downlink symbol, then the UE transmits, and the base station receives, the short PUCCH over symbols 5, 6, 8, 9 (i.e., symbol 7 is skipped because symbol 7 is a downlink symbol).

In some aspects, the UE is configured to transmit the short PUCCH in a single slot. That is, in some aspects, a short PUCCH (with length of at least three symbols) may be restricted (e.g., by a by an applicable standard specification) to being inside one slot. For example, in some aspects, a starting symbol for transmitting the short PUCCH is restricted to cause the short PUCCH to be transmitted in the single slot. As a particular example, a short PUCCH with Format 2 and a length symbols may be permitted to start from symbols {0, . . . , 10} of a given slot (e.g., to cause the short PUCCH with Format 2 and length four to be communicated in single slot). As another example, in some aspects, the short PUCCH is truncated based at least in part on the UE being configured to transmit the short PUCCH in the single slot. That is, in some aspects, the nominal length of the short PUCCH may be truncated in actual transmission/reception due to an end of a slot being reached and/or due to the presence of downlink symbols. In some aspects, in the case of a truncated short PUCCH with Format 2, rate matching may be applied depending on the actual number of symbols.

With respect to example 350, as shown in FIG. 3B by reference 352, the base station may transmit, and the UE may receive, a configuration associated with configuring a number of symbols to be used by the UE for transmitting a short PUCCH. That is, the configuration may include information indicating a configured number of symbols that the UE is to use for transmitting the short PUCCH.

In some aspects, the configured number of symbols is four (4) or less symbols. That is, in some aspects, the configured number of symbols associated with the configuration may be four or less symbols in some aspects. In some aspects, the short PUCCH is a Format 2 PUCCH.

In some aspects, the configuration is a first configuration, and the base station may transmit, and the UE may receive, an indication of a number of symbols to be used for transmitting the short PUCCH, where the indicated number of symbols is different from the configured number of symbols. That is, in some aspects, the indication may indicate or comprise a new configuration, e.g., a second configuration, associated with configuring the number of symbols to be used by the UE for transmitting the short PUCCH. In this way, the number of symbols of the short PUCCH may be modified on the UE by the base station using the indication in some aspects.

As shown by reference 354, the UE may transmit the short PUCCH using the configured number of symbols. Thus, as indicated by reference 354, the base station may receive the short PUCCH in the configured number of symbols (after transmitting the configuration to the UE).

As indicated above, FIGS. 3A and 3B are provided as examples. Other examples may differ from what is described with respect to FIGS. 3A and 3B.

Figure 4:
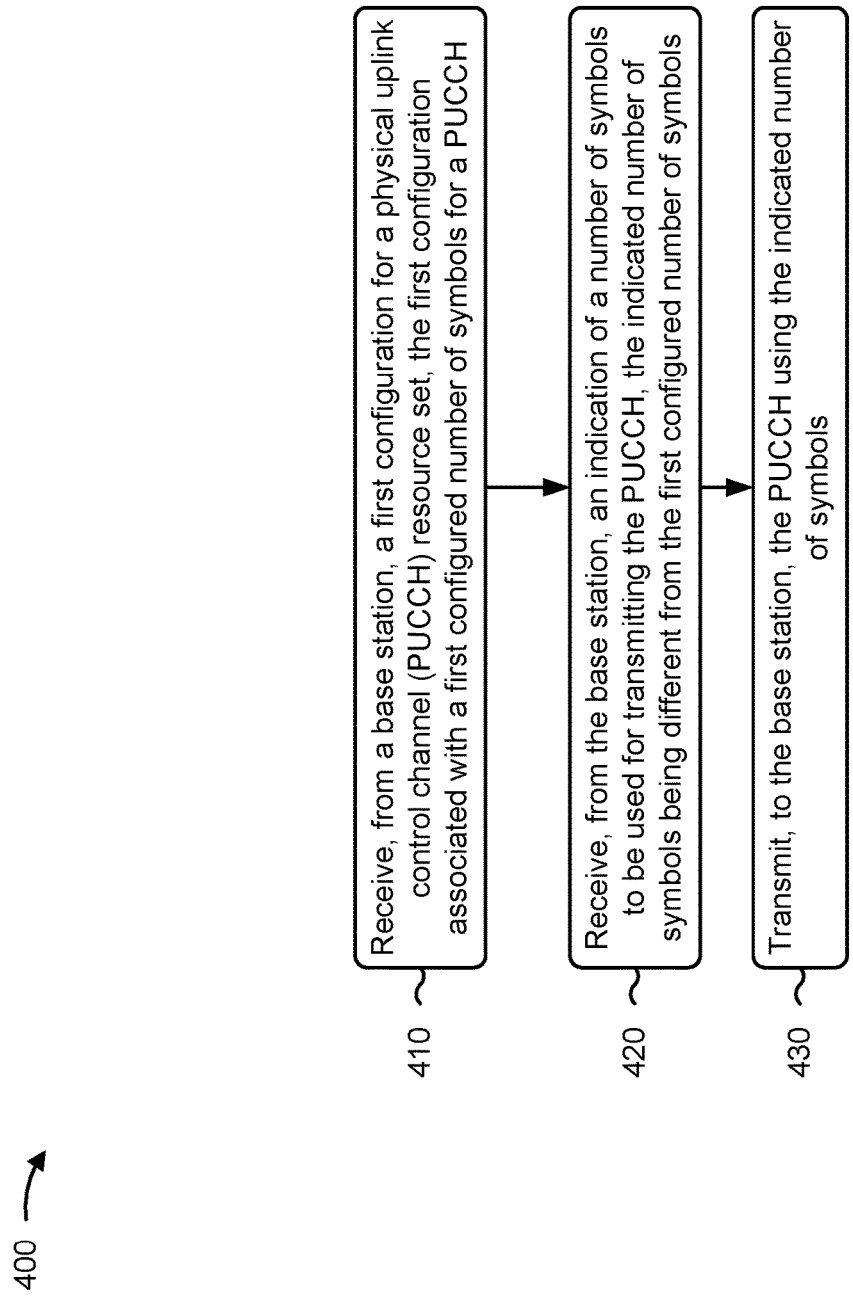
FIGS. 4-7 are diagrams illustrating example processes associated with a PUCCH with an adaptive number of OFDM, in accordance with the present disclosure.

FIG. 4 is a diagram illustrating an example process 400 performed, for example, by a UE, in accordance with the present disclosure. Example process 400 is an example where the UE (e.g., UE 120) performs operations associated with a PUCCH with an adaptive number of symbols.

As shown in FIG. 4, in some aspects, process 400 may include receiving, from a base station, a first configuration for a PUCCH resource set, the first configuration associated with a first configured number of symbols for a PUCCH (block 410). For example, the UE (e.g., using reception component 802, depicted in FIG. 8) may receive, from a base station (e.g., a base station 110), a first configuration for a PUCCH resource set, the first configuration associated with a first configured number of symbols for a PUCCH, as described above, for example, with reference to FIG. 3A.

As shown in FIG. 4, in some aspects, process 400 may include receiving, from the base station, an indication of a number of symbols to be used for transmitting the PUCCH, the indicated number of symbols being different from the first configured number of symbols (block 420). For example, the UE (e.g., using reception component 802, depicted in FIG. 8) may receive, from the base station, an indication of a number of symbols to be used for transmitting the PUCCH, the indicated number of symbols being different from the first configured number of symbols, as described above, for example, with reference to FIG. 3A.

As further shown in FIG. 4, in some aspects, process 400 may include transmitting, to the base station, the PUCCH using the number of symbols (block 430). For example, the UE (e.g., using transmission component 804, depicted in FIG. 8) may transmit, to the base station, the PUCCH using the indicated number of symbols, as described above, for example, with reference to FIG. 3A.

Process 400 may include additional aspects, such as any single aspect or any combination of aspects described below and/or in connection with one or more other processes described elsewhere herein.

In a first aspect, the first configured number of symbols or the indicated number of symbols is greater than two (2) symbols.

In a second aspect, alone or in combination with the first aspect, the indication is a dynamic indication associated with a change from the first configured number of symbols to the indicated number of symbols.

In a third aspect, alone or in combination with one or more of the first and second aspects, the dynamic indication is a UE-specific indication.

In a fourth aspect, alone or in combination with one or more of the first through third aspects, the dynamic indication is received in at least one of group-common DCI or a downlink MAC control element.

In a fifth aspect, alone or in combination with one or more of the first through fourth aspects, the dynamic indication explicitly indicates the number of symbols to be used for transmitting the PUCCH.

In a sixth aspect, alone or in combination with one or more of the first through fifth aspects, the dynamic indication indicates a switch from the first configuration for the PUCCH resource set to a second configuration for the PUCCH resource set, the second configuration including a second configured number of symbols for the PUCCH, and the indicated number of symbols comprises the second configured number of symbols.

In a seventh aspect, alone or in combination with one or more of the first through sixth aspects, the dynamic indication is an implicit indication that is based at least in part on other signaling received by the UE.

In an eighth aspect, alone or in combination with one or more of the first through seventh aspects, the other signaling is a coverage enhancement indication.

In a ninth aspect, alone or in combination with one or more of the first through eighth aspects, the other signaling is a beam switching MAC control element included in a downlink PDSCH.

In a tenth aspect, alone or in combination with one or more of the first through ninth aspects, the PUCCH transmitted by the UE includes at least three one-symbol PUCCHs having PUCCH Format 0, each of the one-symbol PUCCHs including the same uplink control information.

In an eleventh aspect, alone or in combination with one or more of the first through tenth aspects, symbols in which the at least three one-symbol PUCCHs are transmitted are permitted to be non-contiguous symbols based at least in part on a capability of the UE.

In a twelfth aspect, alone or in combination with one or more of the first through eleventh aspects, the PUCCH transmitted by the UE has PUCCH Format 2.

In a thirteenth aspect, alone or in combination with one or more of the first through twelfth aspects, symbols used for transmitting the PUCCH include one or more groups of consecutive non-downlink symbols.

In a fourteenth aspect, alone or in combination with one or more of the first through thirteenth aspects, the UE is configured to transmit the PUCCH in a single slot.

In a fifteenth aspect, alone or in combination with one or more of the first through fourteenth aspects, a starting symbol for transmitting the PUCCH is restricted to cause the PUCCH to be transmitted in the single slot.

In a sixteenth aspect, alone or in combination with one or more of the first through fifteenth aspects, the PUCCH is truncated based at least in part on the UE being configured to transmit the PUCCH in the single slot.

In a seventeenth aspect, alone or in combination with one or more of the first through sixteenth aspects, the indication includes information that identifies a starting symbol for the PUCCH.

In an eighteenth aspect, alone or in combination with one or more of the first through seventeenth aspects, a starting symbol for transmitting the PUCCH matches a starting symbol of a PUCCH resource set configured for the UE.

In a nineteenth aspect, alone or in combination with one or more of the first through eighteenth aspects, the indication includes information that indicates whether the PUCCH is to permitted to be transmitted in non-contiguous symbols.

In a twentieth aspect, alone or in combination with one or more of the first through nineteenth aspects, whether the PUCCH is to permitted to be transmitted in non-contiguous symbols is based at least in part on a configuration of the UE.

In a twenty-first aspect, alone or in combination with one or more of the first through twentieth aspects, the PUCCH is a short PUCCH.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
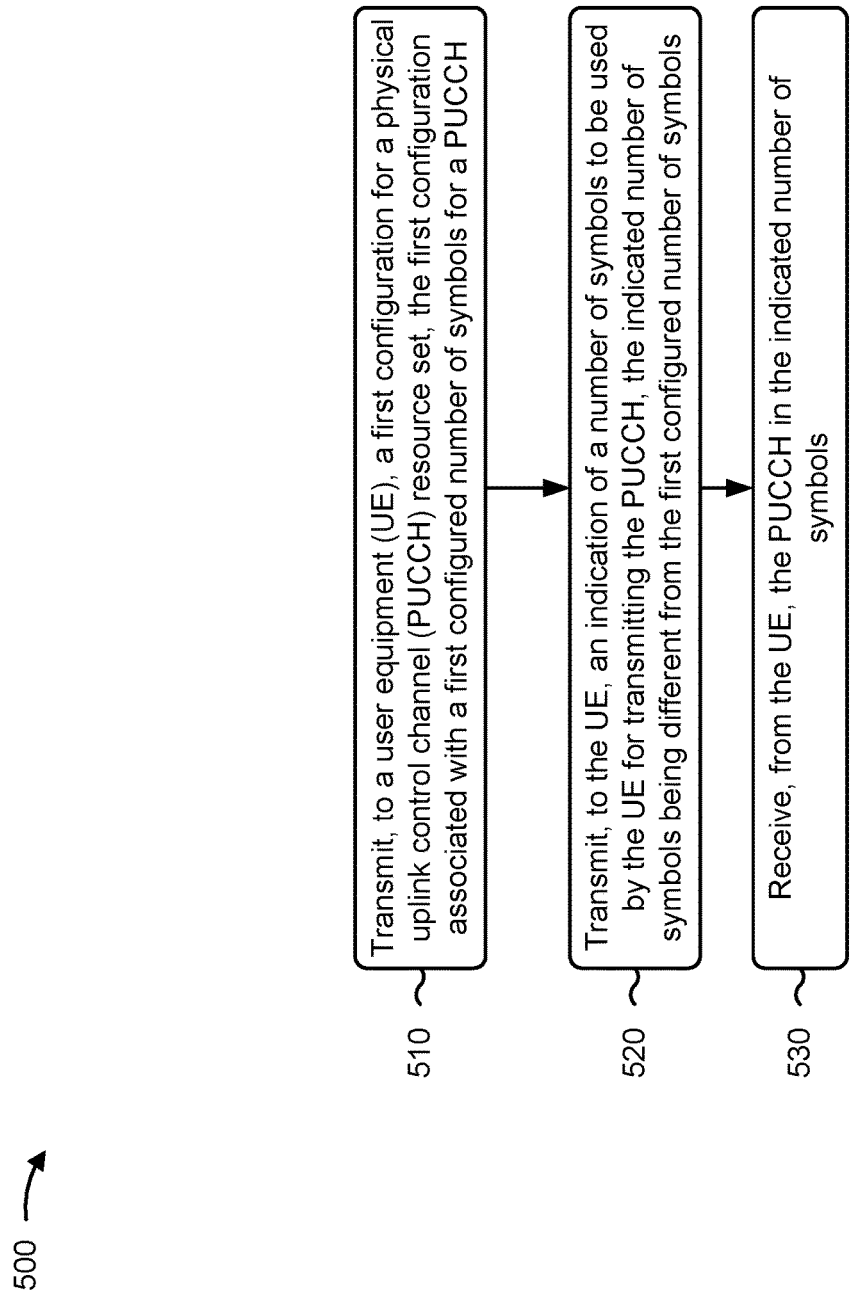

FIG. 5 is a diagram illustrating an example process 500 performed, for example, by a base station, in accordance with the present disclosure. Example process 500 is an example where the base station (e.g., base station 110) performs operations associated with a PUCCH with an adaptive number of symbols.

As shown in FIG. 5, in some aspects, process 500 may include transmitting, to a UE, a first configuration for a physical uplink control channel (PUCCH) resource set, the first configuration associated with a first configured number of symbols for a PUCCH (block 520). For example, the base station (e.g., using transmission component 904, depicted in FIG. 9) may transmit, to a UE (e.g., a UE 120), a first configuration for a PUCCH resource set, the first configuration associated with a first configured number of symbols for a PUCCH, as described above, for example, with reference to FIG. 3A.

As shown in FIG. 5, in some aspects, process 500 may include transmitting, to the UE, an indication of a number of symbols to be used by the UE for transmitting the PUCCH, the indicated number of symbols being different from the first configured number of symbols (block 520). For example, the base station (e.g., using transmission component 904, depicted in FIG. 9) may transmit, to a UE (e.g., a UE 120), an indication of a number of symbols to be used by the UE for transmitting the PUCCH, the indicated number of symbols being different from the first configured number of symbols, as described above, for example, with reference to FIG. 3A.

As further shown in FIG. 5, in some aspects, process 500 may include receiving, from the UE, the PUCCH in the indicated number of symbols (block 530). For example, the base station (e.g., using reception component 902, depicted in FIG. 9) may receive, from the UE, the PUCCH in the indicated number of symbols, as described above, for example, with reference to FIG. 3A.

Process 500 may include additional aspects, such as any single aspect or any combination of aspects described below and/or in connection with one or more other processes described elsewhere herein.

In a first aspect, the first configured number of symbols or the indicated number of symbols is greater than two (2) symbols.

In a second aspect, alone or in combination with the first aspect, the indication is a dynamic indication associated with a change from the first configured number of symbols to the indicated number of symbols.

In a third aspect, alone or in combination with one or more of the first and second aspects, the dynamic indication is a UE-specific indication.

In a fourth aspect, alone or in combination with one or more of the first through third aspects, the dynamic indication is transmitted in at least one of group-common DCI or a downlink MAC control element.

In a fifth aspect, alone or in combination with one or more of the first through fourth aspects, the dynamic indication explicitly indicates the number of symbols to be used for transmitting the PUCCH.

In a sixth aspect, alone or in combination with one or more of the first through fifth aspects, the dynamic indication indicates a switch from the first configuration for the PUCCH resource set to a second configuration for the PUCCH resource set, the second configuration including a second configured number of symbols for the PUCCH, and the indicated number of symbols comprises the second configured number of symbols.

In a seventh aspect, alone or in combination with one or more of the first through sixth aspects, the dynamic indication is an implicit indication that is based at least in part on other signaling transmitted to the UE.

In an eighth aspect, alone or in combination with one or more of the first through seventh aspects, the other signaling is a coverage enhancement indication.

In a ninth aspect, alone or in combination with one or more of the first through eighth aspects, the other signaling is a beam switching MAC control element included in a PDSCH.

In a tenth aspect, alone or in combination with one or more of the first through ninth aspects, the PUCCH received by the base station includes at least three one-symbol PUCCHs having PUCCH Format 0, each of the one-symbol PUCCHs including the same uplink control information.

In an eleventh aspect, alone or in combination with one or more of the first through tenth aspects, symbols in which the at least three one-symbol PUCCHs are received are permitted to be non-contiguous symbols based at least in part on a capability of the UE.

In a twelfth aspect, alone or in combination with one or more of the first through eleventh aspects, the PUCCH received by the base station has PUCCH Format 2.

In a thirteenth aspect, alone or in combination with one or more of the first through twelfth aspects, symbols in which the PUCCH is received include one or more groups of consecutive non-downlink symbols.

In a fourteenth aspect, alone or in combination with one or more of the first through thirteenth aspects, the UE is configured to transmit the PUCCH in a single slot.

In a fifteenth aspect, alone or in combination with one or more of the first through fourteenth aspects, a starting symbol for the PUCCH is restricted to cause the PUCCH to be transmitted in the single slot.

In a sixteenth aspect, alone or in combination with one or more of the first through fifteenth aspects, the PUCCH is truncated based at least in part on the UE being configured to transmit the PUCCH in the single slot.

In a seventeenth aspect, alone or in combination with one or more of the first through sixteenth aspects, the indication includes information that identifies a starting symbol for the PUCCH.

In an eighteenth aspect, alone or in combination with one or more of the first through seventeenth aspects, a starting symbol for transmitting the PUCCH matches a starting symbol of a PUCCH resource set configured for the UE.

In a nineteenth aspect, alone or in combination with one or more of the first through eighteenth aspects, the indication includes information that indicates whether the PUCCH is to be permitted to be transmitted in non-contiguous symbols.

In a twentieth aspect, alone or in combination with one or more of the first through nineteenth aspects, whether the PUCCH is to permitted to be transmitted in non-contiguous symbols is based at least in part on a configuration of the UE.

In a twenty-first aspect, alone or in combination with one or more of the first through twentieth aspects, the PUCCH is a short PUCCH.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
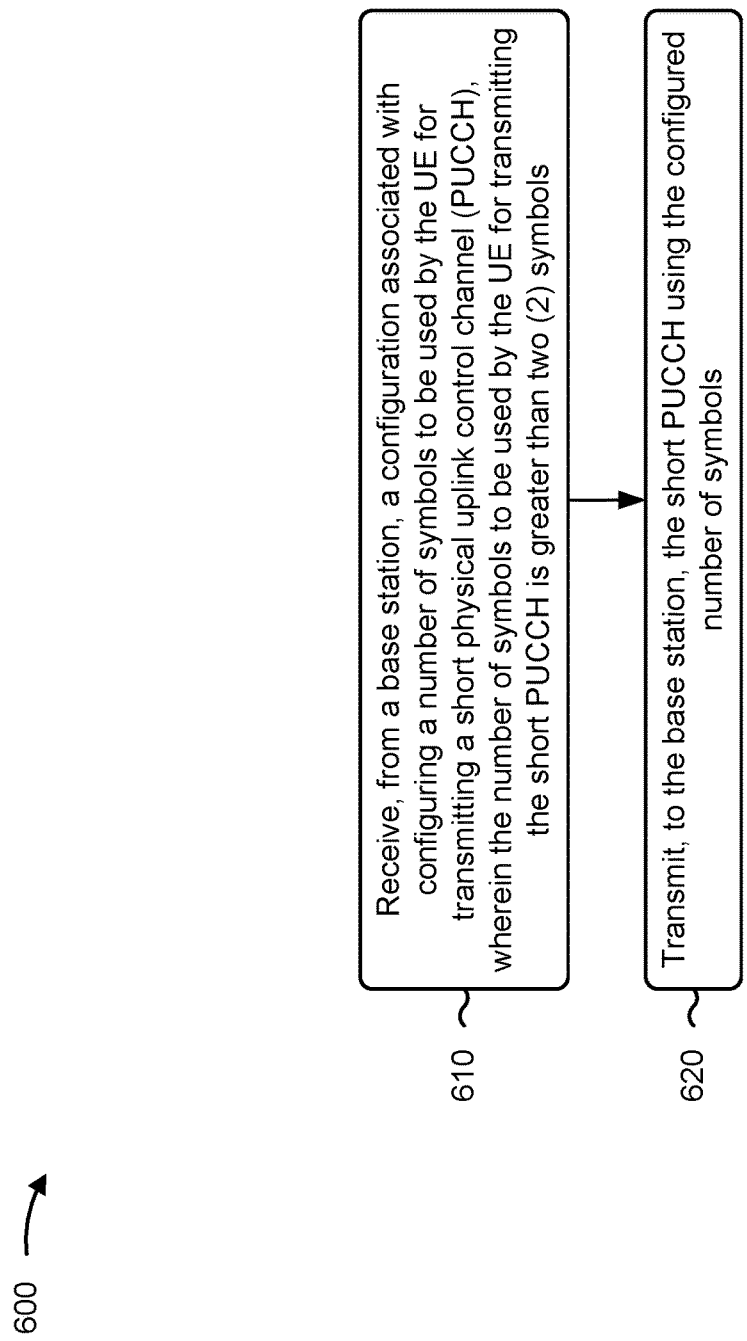

FIG. 6 is a diagram illustrating an example process 600 performed, for example, by a UE, in accordance with the present disclosure. Example process 600 is an example where the UE (e.g., UE 120) performs operations associated with a short PUCCH with an adaptive number of symbols.

As shown in FIG. 6, in some aspects, process 600 may include receiving, from a base station, a configuration associated with configuring a number of symbols to be used by the UE for transmitting a short PUCCH (block 610). For example, the UE (e.g., using reception component 802, depicted in FIG. 8) may receive, from a base station (e.g., a base station 11), a configuration associated with configuring a number of symbols to be used by the UE for transmitting a short PUCCH, as described above, for example, with reference to FIG. 3B. In some aspects, the number of symbols to be used by the UE for transmitting the short PUCCH is greater than two (2) symbols.

As further shown in FIG. 6, in some aspects, process 600 may include transmitting, to the base station, the short PUCCH using the configured number of symbols (block 620). For example, the UE (e.g., using transmission component 804, depicted in FIG. 8) may transmit, to the base station, the short PUCCH using the configured number of symbols, as described above, for example, with reference to FIG. 3B.

Process 600 may include additional aspects, such as any single aspect or any combination of aspects described below and/or in connection with one or more other processes described elsewhere herein.

In a first aspect, the configured number of symbols is four (4) or less symbols.

In a second aspect, alone or in combination with the first aspect, the short PUCCH is a Format 2 PUCCH.

In a third aspect, alone or in combination with one or more of the first and second aspects, the configuration is a first configuration, and the method further comprises receiving an indication of a number of symbols to be used for transmitting the short PUCCH, the indicated number of symbols being different from the first configured number of symbols.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
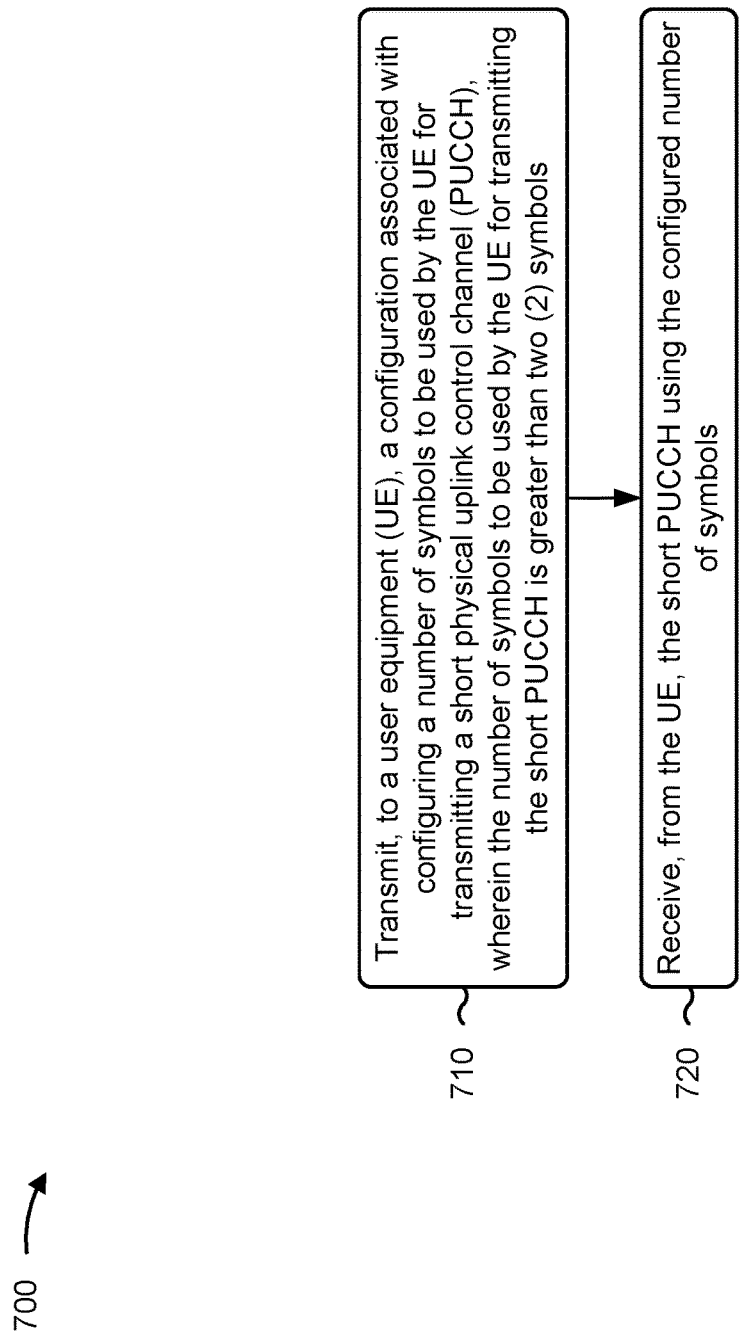

FIG. 7 is a diagram illustrating an example process 700 performed, for example, by a base station, in accordance with the present disclosure. Example process 700 is an example where the base station (e.g., base station 110) performs operations associated with a short PUCCH with an adaptive number of symbols.

As shown in FIG. 7, in some aspects, process 700 may include transmitting, to a UE, a configuration associated with configuring a number of symbols to be used by the UE for transmitting a short PUCCH (block 710). For example, the base station (e.g., using transmission component 904, depicted in FIG. 9) may transmit, to a UE (e.g., a UE 120), a configuration associated with configuring a number of symbols to be used by the UE for transmitting a short PUCCH, as described above, for example, with reference to FIG. 3B. In some aspects, the number of symbols to be used by the UE for transmitting the short PUCCH is greater than two (2) symbols.

As further shown in FIG. 7, in some aspects, process 700 may include receiving, from the UE, the short PUCCH using the configured number of symbols (block 720). For example, the base station (e.g., using reception component 902, depicted in FIG. 9) may receive, from the UE, the short PUCCH using the configured number of symbols, as described above, for example, with reference to FIG. 3B.

Process 700 may include additional aspects, such as any single aspect or any combination of aspects described below and/or in connection with one or more other processes described elsewhere herein.

In a first aspect, the configured number of symbols is four (4) or less symbols.

In a second aspect, alone or in combination with the first aspect, the short PUCCH is a Format 2 PUCCH.

In a third aspect, alone or in combination with one or more of the first and second aspects, the configuration is a first configuration, and the method further comprises transmitting an indication of a number of symbols to be used for transmitting the short PUCCH, the indicated number of symbols being different from the first configured number of symbols.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
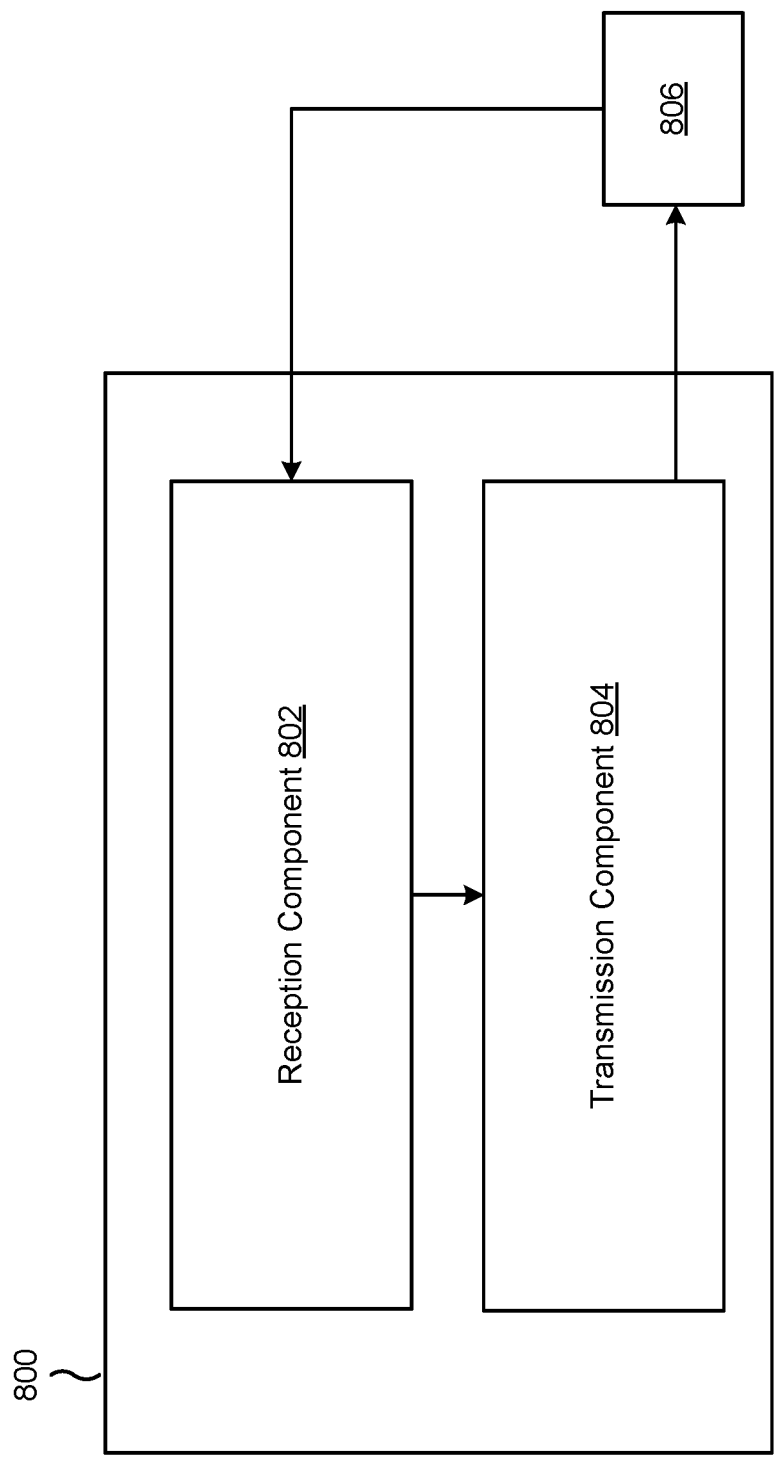
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 3A and/or 3B. Additionally or alternatively, the apparatus 800 may be configured to perform one or more processes described herein, such as process 400 of FIG. 4, process 600 of FIG. 6, or some combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, from a base station, a first configuration for a PUCCH resource set, the first configuration associated with a first configured number of symbols for a PUCCH. The reception component 802 may receive, from the base station, an indication of a number of symbols to be used for transmitting the PUCCH, the indicated number of symbols being different from the first configured number of symbols. The transmission component 804 may transmit the PUCCH using the indicated number of symbols.

The reception component 802 may receive, from a base station, a configuration associated with configuring a number of symbols to be used by the UE for transmitting a short PUCCH, where the number of symbols to be used by the UE for transmitting the short PUCCH is greater than two (2) symbols. The transmission component 804 may transmit, to the base station, the short PUCCH using the configured number of symbols.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
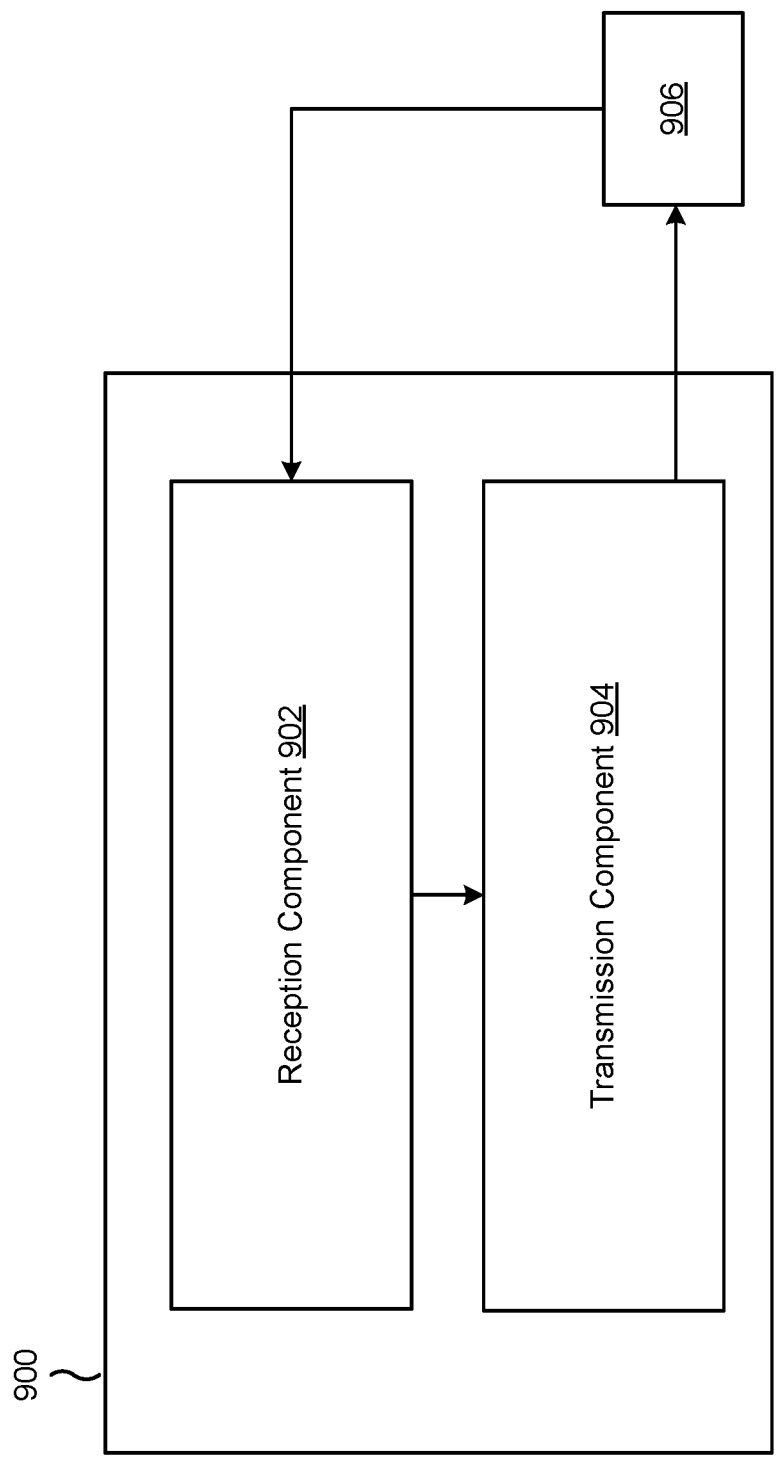

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 3A and/or 3B. Additionally or alternatively, the apparatus 900 may be configured to perform one or more processes described herein, such as process 500 of FIG. 5, process 700 of FIG. 7, or some combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to a UE, a first configuration for a PUCCH resource set, the first configuration associated with a first configured number of symbols for a PUCCH. The transmission component 904 may transmit, to the UE, an indication of a number of symbols to be used by the UE for transmitting the PUCCH, the indicated number of symbols being different from the first configured number of symbols. The reception component 902 may receive the PUCCH in the indicated number of symbols.

The transmission component 904 may transmit, to a UE, a configuration associated with configuring a number of symbols to be used by the UE for transmitting a short PUCCH, where the number of symbols to be used by the UE for transmitting the short PUCCH is greater than two (2) symbols. The reception component 902 may receive, from the UE, the short PUCCH using the configured number of symbols.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9. The following provides an overview of some Aspects of the present disclosure:

Aspect 1: A method of wireless communication performed by a UE, comprising: receiving, from a base station, a first configuration for a PUCCH resource set, the first configuration associated with a first configured number of symbols for a PUCCH; receiving, from the base station, an indication of a number of symbols to be used for transmitting the PUCCH, the indicated number of symbols being different from the first configured number of symbols; and transmitting, to the base station, the PUCCH using the indicated number of symbols.

Aspect 2: The method of Aspect 1, wherein the first configured number of symbols or the indicated number of symbols is greater than two (2) symbols.

Aspect 3: The method of any of Aspects 1-2, wherein the indication is a dynamic indication associated with a change from the first configured number of symbols to the indicated number of symbols.

Aspect 4: The method of Aspect 3, wherein the dynamic indication is a UE-specific indication.

Aspect 5: The method of Aspect 3, wherein the dynamic indication is received in at least one of group-common downlink control information (DCI) or a downlink medium access control (MAC) control element.

Aspect 6: The method of Aspect 3, wherein the dynamic indication explicitly indicates the number of symbols to be used for transmitting the PUCCH.

Aspect 7: The method of Aspect 3, wherein the dynamic indication indicates a switch from the first configuration for the PUCCH resource set to a second configuration for the PUCCH resource set, the second configuration including a second configured number of symbols for the PUCCH and wherein the indicated number of symbols comprises the second configured number of symbols.

Aspect 8: The method of Aspect 3, wherein the dynamic indication is an implicit indication that is based at least in part on other signaling received by the UE.

Aspect 9: The method of Aspect 8, wherein the other signaling is a coverage enhancement indication.

Aspect 10: The method of Aspect 8, wherein the other signaling is a beam switching medium access control (MAC) control element included in a physical downlink shared channel (PDSCH).

Aspect 11: The method of any of Aspects 1-10, wherein the PUCCH transmitted by the UE includes at least three one-symbol PUCCHs having PUCCH Format 0, each of the one-symbol PUCCHs including the same uplink control information.

Aspect 12: The method of Aspect 11, wherein symbols in which the at least three one-symbol PUCCHs are transmitted are permitted to be non-contiguous symbols based at least in part on a capability of the UE.

Aspect 13: The method any of Aspects 1-12, wherein the PUCCH transmitted by the UE has PUCCH Format 2.

Aspect 14: The method of any of Aspects 1-13, wherein symbols used for transmitting the PUCCH include one or more groups of consecutive non-downlink symbols.

Aspect 15: The method of any of Aspects 1-14, wherein the UE is configured to transmit the PUCCH in a single slot.

Aspect 16: The method of Aspect 15, wherein a starting symbol for transmitting the PUCCH is restricted to cause the PUCCH to be transmitted in the single slot.

Aspect 17: The method of Aspect 15, wherein the PUCCH is truncated based at least in part on the UE being configured to transmit the PUCCH in the single slot.

Aspect 18: The method of any of Aspects 1-17, wherein the indication includes information that identifies a starting symbol for the PUCCH.

Aspect 19: The method of any of Aspects 1-18, wherein a starting symbol for transmitting the PUCCH matches a starting symbol of a PUCCH resource set configured for the UE.

Aspect 20: The method of any of Aspects 1-19, wherein the indication includes information that indicates whether the PUCCH is to permitted to be transmitted in non-contiguous symbols.

Aspect 21: The method of any of Aspects 1-20, wherein whether the PUCCH is to permitted to be transmitted in non-contiguous symbols is based at least in part on a configuration of the UE.

Aspect 22: The method of any of Aspects 1-21, wherein the PUCCH is a short PUCCH.

Aspect 23: A method of wireless communication performed by a base station, comprising: transmitting, to a UE, a first configuration for a PUCCH resource set, the first configuration associated with a first configured number of symbols for a short PUCCH; transmitting, to the UE, an indication of a number of symbols to be used by the UE for transmitting the short PUCCH, the indicated number of symbols being different from the first configured number of symbols; and receiving, from the UE, the short PUCCH in the indicated number of symbols.

Aspect 24: The method of Aspect 23, wherein the first configured number of symbols or the indicated number of symbols is greater than two (2) symbols.

Aspect 25: The method of any of Aspects 23-24, wherein the indication is a dynamic indication associated with a change from the first configured number of symbols to the indicated number of symbols.

Aspect 26: The method of Aspect 25, wherein the dynamic indication is a UE-specific indication.

Aspect 27: The method of Aspect 25, wherein the dynamic indication is transmitted in at least one of group-common downlink control information (DCI) or a downlink medium access control (MAC) control element.

Aspect 28: The method of Aspect 25, wherein the dynamic indication explicitly indicates the number of symbols to be used for transmitting the short PUCCH.

Aspect 29: The method of Aspect 25, wherein the dynamic indication indicates a switch from the first configuration for the PUCCH resource set to a second configuration for the PUCCH resource set, the second configuration including a second configured number of symbols for the short PUCCH and wherein the indicated number of symbols comprises the second configured number of symbols.

Aspect 30: The method of Aspect 25, wherein the dynamic indication is an implicit indication that is based at least in part on other signaling transmitted to the UE.

Aspect 31: The method of Aspect 30, wherein the other signaling is a coverage enhancement indication.

Aspect 32: The method of Aspect 30, wherein the other signaling is a beam switching medium access control (MAC) control element included in a physical downlink shared channel (PDSCH).

Aspect 33: The method of any of Aspects 23-32, wherein the short PUCCH received by the base station includes at least three one-symbol PUCCHs having PUCCH Format 0, each of the one-symbol PUCCHs including the same uplink control information.

Aspect 34: The method of Aspect 33, wherein symbols in which the at least three one-symbol PUCCHs are received are permitted to be non-contiguous symbols based at least in part on a capability of the UE.

Aspect 35: The method of any of Aspects 23-34, wherein the short PUCCH received by the base station has PUCCH Format 2.

Aspect 36: The method of any of Aspects 23-35, wherein symbols in which the short PUCCH is received include one or more groups of consecutive non-downlink symbols.

Aspect 37: The method of any of Aspects 23-35, wherein the UE is configured to transmit the short PUCCH in a single slot.

Aspect 38: The method of Aspect 37, wherein a starting symbol for the short PUCCH is restricted to cause the short PUCCH to be transmitted in the single slot.

Aspect 39: The method of Aspect 37, wherein the short PUCCH is truncated based at least in part on the UE being configured to transmit the short PUCCH in the single slot.

Aspect 40: The method of any of Aspects 23-39, wherein the indication includes information that identifies a starting symbol for the short PUCCH.

Aspect 41: The method of any of Aspects 23-40, wherein a starting symbol for transmitting the short PUCCH matches a starting symbol of a PUCCH resource set configured for the UE.

Aspect 42: The method of any of Aspects 23-41, wherein the indication includes information that indicates whether the short PUCCH is to be permitted to be transmitted in non-contiguous symbols.

Aspect 43: The method of any of Aspects 23-42, wherein whether the short PUCCH is to permitted to be transmitted in non-contiguous symbols is based at least in part on a configuration of the UE.

Aspect 44: The method of any of Aspects 23-43, wherein the PUCCH is a short PUCCH.

Aspect 45: A method of wireless communication performed by a UE, comprising: receiving, from a base station, a configuration associated with configuring a number of symbols to be used by the UE for transmitting a short PUCCH, wherein the number of symbols to be used by the UE for transmitting the short PUCCH is greater than two (2) symbols; and transmitting, to the base station, the short PUCCH using the configured number of symbols.

Aspect 46: The method of Aspect 45, wherein the configured number of symbols is four (4) or less symbols.

Aspect 47: The method of any of Aspects 45-46, wherein the short PUCCH is a Format 2 PUCCH.

Aspect 48: The method of any of Aspects 45-47, wherein the configuration is a first configuration, and the method further comprises receiving an indication of a number of symbols to be used for transmitting the short PUCCH, the indicated number of symbols being different from the first configured number of symbols.

Aspect 49: A method of wireless communication performed by a base station, comprising: transmitting, to a UE, a configuration associated with configuring a number of symbols to be used by the UE for transmitting a short PUCCH, wherein the number of symbols to be used by the UE for transmitting the short PUCCH is greater than two (2) symbols; and receiving, from the UE, the short PUCCH using the configured number of symbols.

Aspect 50: The method of Aspect 49, wherein the configured number of symbols is four (4) or less symbols.

Aspect 51: The method of any of Aspects 49-50, wherein the short PUCCH is a Format 2 PUCCH.

Aspect 52: The method of any of Aspects 49-51, wherein the configuration is a first configuration, and the method further comprises transmitting an indication of a number of symbols to be used for transmitting the short PUCCH, the indicated number of symbols being different from the first configured number of symbols.

Aspect 53: An apparatus for wireless communication at a device, comprising a processor; memory coupled with the processor; and instructions stored in the memory and executable by the processor to cause the apparatus to perform the method of one or more of Aspects 1-22.

Aspect 54: A device for wireless communication, comprising a memory and one or more processors coupled to the memory, the one or more processors configured to perform the method of one or more of Aspects 1-22.

Aspect 55: An apparatus for wireless communication, comprising at least one means for performing the method of one or more of Aspects 1-22.

Aspect 56: A non-transitory computer-readable medium storing code for wireless communication, the code comprising instructions executable by a processor to perform the method of one or more of Aspects 1-22.

Aspect 57: A non-transitory computer-readable medium storing a set of instructions for wireless communication, the set of instructions comprising one or more instructions that, when executed by one or more processors of a device, cause the device to perform the method of one or more of Aspects 1-22.

Aspect 58: An apparatus for wireless communication at a device, comprising a processor; memory coupled with the processor; and instructions stored in the memory and executable by the processor to cause the apparatus to perform the method of one or more of Aspects 23-44.

Aspect 59: A device for wireless communication, comprising a memory and one or more processors coupled to the memory, the one or more processors configured to perform the method of one or more of Aspects 23-44.

Aspect 60: An apparatus for wireless communication, comprising at least one means for performing the method of one or more of Aspects 23-44.

Aspect 61: A non-transitory computer-readable medium storing code for wireless communication, the code comprising instructions executable by a processor to perform the method of one or more of Aspects 23-44.

Aspect 62: A non-transitory computer-readable medium storing a set of instructions for wireless communication, the set of instructions comprising one or more instructions that, when executed by one or more processors of a device, cause the device to perform the method of one or more of Aspects 23-44.

Aspect 63: An apparatus for wireless communication at a device, comprising a processor; memory coupled with the processor; and instructions stored in the memory and executable by the processor to cause the apparatus to perform the method of one or more of Aspects 45-48.

Aspect 64: A device for wireless communication, comprising a memory and one or more processors coupled to the memory, the one or more processors configured to perform the method of one or more of Aspects 45-48.

Aspect 65: An apparatus for wireless communication, comprising at least one means for performing the method of one or more of Aspects 45-48.

Aspect 66: A non-transitory computer-readable medium storing code for wireless communication, the code comprising instructions executable by a processor to perform the method of one or more of Aspects 45-48.

Aspect 67: A non-transitory computer-readable medium storing a set of instructions for wireless communication, the set of instructions comprising one or more instructions that, when executed by one or more processors of a device, cause the device to perform the method of one or more of Aspects 45-48.

Aspect 68: An apparatus for wireless communication at a device, comprising a processor; memory coupled with the processor; and instructions stored in the memory and executable by the processor to cause the apparatus to perform the method of one or more of Aspects 49-52.

Aspect 69: A device for wireless communication, comprising a memory and one or more processors coupled to the memory, the one or more processors configured to perform the method of one or more of Aspects 49-52.

Aspect 70: An apparatus for wireless communication, comprising at least one means for performing the method of one or more of Aspects 49-52.

Aspect 71: A non-transitory computer-readable medium storing code for wireless communication, the code comprising instructions executable by a processor to perform the method of one or more of Aspects 49-52.

Aspect 72: A non-transitory computer-readable medium storing a set of instructions for wireless communication, the set of instructions comprising one or more instructions that, when executed by one or more processors of a device, cause the device to perform the method of one or more of Aspects 49-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a base station, a first configuration for a physical uplink control channel (PUCCH) resource set, the first configuration indicating a first configured number of symbols for a PUCCH that includes a Format 0 PUCCH;
receiving, from the base station and for the PUCCH resource set, an indication of a number of symbols to be used for transmitting the PUCCH, wherein the indicated number of symbols is greater than two (2) symbols; and
transmitting, to the base station, the PUCCH using the indicated number of symbols.

2. The method of claim 1, wherein the indication is a dynamic indication associated with a change from the first configured number of symbols to the indicated number of symbols.

3. The method of claim 2, wherein the dynamic indication is a UE-specific indication.

4. The method of claim 2, wherein the dynamic indication is received in at least one of group-common downlink control information (DCI) or a downlink medium access control (MAC) control element.

5. The method of claim 2, wherein the dynamic indication explicitly indicates the number of symbols to be used for transmitting the PUCCH.

6. The method of claim 2, wherein the dynamic indication indicates a switch from the first configuration for the PUCCH resource set to a second configuration for the PUCCH resource set, the second configuration including a second configured number of symbols for the PUCCH and wherein the indicated number of symbols comprises the second configured number of symbols.

7. The method of claim 2, wherein the dynamic indication is an implicit indication that is based at least in part on other signaling received by the UE.

8. The method of claim 7, wherein the other signaling is a coverage enhancement indication.

9. The method of claim 7, wherein the other signaling is a beam switching medium access control (MAC) control element included in a physical downlink shared channel (PDSCH).

10. The method of claim 1, wherein the PUCCH transmitted by the UE includes at least three one-symbol PUCCHs having PUCCH Format 0, each of the one-symbol PUCCHs including the same uplink control information, wherein symbols in which the at least three one-symbol PUCCHs are transmitted are permitted to be non-contiguous symbols based at least in part on a capability of the UE.

11. The method of claim 1, wherein symbols used for transmitting the PUCCH include one or more groups of consecutive non-downlink symbols.

12. The method of claim 1, wherein the UE is configured to transmit the PUCCH in a single slot, and
wherein a starting symbol for transmitting the PUCCH is restricted to cause the PUCCH to be transmitted in the single slot, or
wherein the PUCCH is truncated based at least in part on the UE being configured to transmit the PUCCH in the single slot.

13. The method of claim 1, wherein the indication includes information that identifies a starting symbol for the PUCCH.

14. The method of claim 1, wherein a starting symbol for transmitting the PUCCH matches a starting symbol of a PUCCH resource set configured for the UE.

15. The method of claim 1, wherein the indication includes information that indicates whether the PUCCH is to permitted to be transmitted in non-contiguous symbols.

16. The method of claim 1, wherein whether the PUCCH is to permitted to be transmitted in non-contiguous symbols is based at least in part on a configuration of the UE.

17. The method of claim 1, wherein the PUCCH is a short PUCCH.

18. A user equipment (UE) for wireless communication, comprising:
a memory; and
one or more processors, coupled to the memory, configured to:
receive, from a base station, a first configuration for a physical uplink control channel (PUCCH) resource set, the first configuration indicating a first configured number of symbols for a PUCCH that includes a Format 0 PUCCH;
receive, from the base station and for the PUCCH resource set, an indication of a number of symbols to be used for transmitting the PUCCH, wherein the indicated number of symbols is greater than two (2) symbols; and
transmit, to the base station, the PUCCH using the indicated number of symbols.

19. The UE of claim 18, wherein the indication is a dynamic indication associated with a change from the first configured number of symbols to the indicated number of symbols.

20. The UE of claim 18, wherein the PUCCH transmitted by the UE includes at least three one-symbol PUCCHs having PUCCH Format 0, each of the one-symbol PUCCHs including the same uplink control information, wherein symbols in which the at least three one-symbol PUCCHs are transmitted are permitted to be non-contiguous symbols based at least in part on a capability of the UE.

21. The UE of claim 18, wherein the UE is configured to transmit the PUCCH in a single slot, and
wherein a starting symbol for transmitting the PUCCH is restricted to cause the PUCCH to be transmitted in the single slot, or
wherein the PUCCH is truncated based at least in part on the UE being configured to transmit the PUCCH in the single slot.

22. The UE of claim 19, wherein the dynamic indication is a UE-specific indication.

23. The UE of claim 19, wherein the dynamic indication explicitly indicates the number of symbols to be used for transmitting the PUCCH.

24. The UE of claim 19, wherein the dynamic indication is an implicit indication that is based at least in part on other signaling received by the UE.

25. A method of wireless communication performed by a user equipment (UE), comprising:
receiving, from a base station, a configuration associated with configuring a number of symbols to be used by the UE for transmitting a short physical uplink control channel (PUCCH) that includes a Format 0 PUCCH, wherein the number of symbols to be used by the UE for transmitting the short PUCCH is greater than two (2) symbols; and
transmitting, to the base station, the short PUCCH using the configured number of symbols.

26. The method of claim 25, wherein the configured number of symbols is four (4) or less symbols.

27. The method of claim 25, wherein the short PUCCH is a Format 2 PUCCH.

28. The method of claim 25, wherein the configuration is a first configuration, and the method further comprises receiving an indication of a number of symbols to be used for transmitting the short PUCCH, the indicated number of symbols being different from the configured number of symbols.

29. A user equipment (UE) for wireless communication, comprising:
- a memory; and
- one or more processors, coupled to the memory, configured to:
  - receive, from a base station, a configuration associated with configuring a number of symbols to be used by the UE for transmitting a short physical uplink control channel (PUCCH) that includes a Format 0 PUCCH, wherein the number of symbols to be used by the UE for transmitting the short PUCCH is greater than two (2) symbols; and
  - transmit, to the base station, the short PUCCH using the configured number of symbols.

30. The UE of claim 29, wherein the configuration is a first configuration, and the one or more processors are further configured to receive an indication of a number of symbols to be used for transmitting the short PUCCH, the indicated number of symbols being different from the configured number of symbols.

* * * * *